US012782528B2

(12) United States Patent
Huang

(10) Patent No.: US 12,782,528 B2
(45) Date of Patent: Nov. 3, 2026

(54) DUAL-WAVELENGTH PHASE RANGE FINDER FOR IMPROVING MEASUREMENT OF VISION CAPTURE

(71) Applicant: SNDWAY TECHNOLOGY (GUANGDONG) CO., LTD., Dongguan (CN)

(72) Inventor: Zan Huang, Dongguan (CN)

(73) Assignee: SNDWAY TECHNOLOGY (GUANGDONG) CO., LTD., Dongguan (CN)

( * ) Notice: Subject to any disclaimer, the term of this patent is extended or adjusted under 35 U.S.C. 154(b) by 558 days.

(21) Appl. No.: 18/465,178

(22) Filed: Sep. 12, 2023

(65) Prior Publication Data

US 2024/0175998 A1 May 30, 2024

(30) Foreign Application Priority Data

Nov. 30, 2022 (CN) ........................ 202223208294.6

(51) Int. Cl.
*G01S 7/4912* (2020.01)
*G01S 7/481* (2006.01)
*G01S 7/4911* (2020.01)
*G01S 7/493* (2006.01)
*G01S 17/36* (2006.01)

(52) U.S. Cl.
CPC .......... *G01S 7/4917* (2013.01); *G01S 7/4815* (2013.01); *G01S 7/4911* (2013.01); *G01S 7/493* (2013.01); *G01S 17/36* (2013.01)

(58) Field of Classification Search
CPC .... G01S 7/4917; G01S 7/4815; G01S 7/4911; G01S 7/493; G01S 17/36; G01S 7/4913; G01S 7/51; G01S 17/34
See application file for complete search history.

(56) References Cited

U.S. PATENT DOCUMENTS

2014/0071432 A1* 3/2014 Dunne .................... G01S 7/497 356/5.01
2015/0088448 A1* 3/2015 Du ........................ G01S 7/4911 702/97

(Continued)

FOREIGN PATENT DOCUMENTS

TW 202016502 A * 5/2020 ........... H10H 20/855
WO WO-2022271874 A1 * 12/2022 ............. G01S 17/36

*Primary Examiner* — Assres H Woldemaryam

(57) ABSTRACT

A dual-wavelength phase range finder for improving measurement of vision capture is provided. A frequency synthesizing device generates a high-frequency modulation signal, and the high-frequency modulation signal forms an outer optical path and an inner optical path after passing through a laser processing device. A processing device controls a laser aiming device to emit a visible light signal. A filtering device allows a first reflecting light signal and a second invisible light signal to pass through, and blocks a second reflecting light signal. The processing device further controls a receiver to process the first reflecting light signal and a reference signal to obtain a first low-frequency signal, and controls the receiver to perform a photoelectric frequency mixing process on the second invisible light signal and the reference signal to obtain a second low-frequency signal. The processing device determines a distance based on the first and second low-frequency signals.

19 Claims, 3 Drawing Sheets

(56) References Cited

U.S. PATENT DOCUMENTS

| | | | | |
|---|---|---|---|---|
| 2016/0124078 | A1* | 5/2016 | Du | G01S 7/481<br>356/6 |
| 2020/0232895 | A1* | 7/2020 | Herman | B60S 1/0818 |
| 2020/0256961 | A1* | 8/2020 | Gaalema | G01S 7/4817 |
| 2021/0247495 | A1* | 8/2021 | Hu | G01S 7/4861 |

* cited by examiner

DUAL-WAVELENGTH PHASE RANGE FINDER FOR IMPROVING MEASUREMENT OF VISION CAPTURE

TECHNICAL FIELD

The disclosure relates to the field of laser ranging, in particular to a dual-wavelength phase range finder for improving measurement of vision capture.

BACKGROUND

Laser-ranging devices are widely used in fields such as architecture and interior decoration due to their high measurement accuracy.

However, for traditional laser ranging devices, it is difficult for a naked eye of a user to clearly see whether a laser irradiates a target in a strong light environment, and the ranging to the target may be performed under a condition that the laser does not irradiate the target, thereby resulting in a problem of inaccurate measurement.

SUMMARY

In view of the above shortcomings in the related art, a purpose of the disclosure is to provide a dual-wavelength phase range finder for improving measurement of visual capture, and the range finder solves the technical problem of inaccurate measurement in the related art.

In order to achieve the above purpose, main technical solutions provided by the disclosure are as follows.

The disclosure provides a dual-wavelength phase range finder for improving measurement of visual capture, and the dual-wavelength phase range finder includes an emitting device, a receiving device, and a processing device. Specifically, the emitting device includes a frequency synthesizing device, a laser processing device, and a laser aiming device. The laser processing device is connected between the frequency synthesizing device and the laser aiming device. The processing device is configured to control the frequency synthesizing device to generate a high-frequency modulation signal and a reference signal. The high-frequency modulation signal passes through the laser processing device to define an outer optical path emitted to a target and define an inner optical path emitted to a filtering device of the receiving device, the processing device is further configured to control the laser aiming device to emit a visible light signal for aiming at the target, the outer optical path is configured to emit a first invisible light signal, the inner optical path is configured to emit a second invisible light signal, and a wavelength of the first invisible light signal is equal to a wavelength of the second invisible light signal. Furthermore, the receiving device includes the filtering device, a receiver, and a signal-transmitting circuit. The filtering device is configured to allow a first reflecting light signal and the second invisible light signal to pass through, the first reflecting light signal is obtained by reflecting the first invisible light signal after the first invisible light signal is irradiated onto the target, and the second invisible light signal is emitted by the inner optical path; the filtering device is further configured to block a second reflecting light signal, and the second reflecting light signal is obtained by reflecting the visible light signal after the visible light signal is irradiated onto the target; the processing device is further configured to control the first invisible light signal and the reference signal to undergo a photoelectric frequency mixing process at the receiver, thereby to obtain a first low-frequency signal; the processing device is further configured to control the second invisible light signal and the reference signal to undergo the photoelectric frequency mixing process at the receiver, thereby to obtain a second low-frequency signal; and the first low-frequency signal and the second low-frequency signal are transmitted to the processing device through the signal-transmitting circuit. The processing device is configured to determine a distance between the dual-wavelength phase range finder and the target based on the first low-frequency signal and the second low-frequency signal.

Therefore, in an embodiment of the disclosure, the laser aiming device is added to the dual-wavelength phase range finder, the laser aiming device is configured to emit the visible light signal to the naked eye, and the outer optical path is configured to emit the first invisible light signal for measurement, and thus the measurement can be performed by a dual-wavelength measurement method. Even in a strong light environment, the naked eye of the user can also accurately see whether the visible light is irradiated on the target, and thus the range finder can adapt to measurements in various environments. The dual-wavelength phase range finder also improves measurement range, measurement accuracy, and measurement speed, and the dual-wavelength phase range finder solves the problem of large measurement errors in various complex environments.

In an embodiment, a wavelength of the visible light signal is smaller than the wavelength of the first invisible light signal.

In an embodiment, the signal-transmitting circuit includes a transconductance amplification circuit and a low-frequency bandpass amplification circuit. The transconductance amplification circuit is configured to respectively pre-amplify the first low-frequency signal and the second low-frequency signal to obtain a pre-amplified first low-frequency signal and a pre-amplified second low-frequency signal, and transmit the pre-amplified first low-frequency signal and the pre-amplified second low-frequency signal to the low-frequency bandpass amplification circuit. The low-frequency bandpass amplification circuit is configured to respectively amplify the pre-amplified first low-frequency signal and the pre-amplified second low-frequency signal in a preset frequency range, thereby to obtain an amplified first low-frequency signal and an amplified second low-frequency signal, and transmit the amplified first low-frequency signal and the amplified second low-frequency signal to the processing device.

In an embodiment, the dual-wavelength phase range finder further includes a bias circuit configured to generate and supply a bias voltage to the receiver under control of the processing device, and one end of the bias circuit is connected to the processing device and the other end of the bias circuit is connected to the receiver.

In an embodiment, the dual-wavelength phase range finder further includes a display device configured to display the distance, and the display device is connected to the processing device.

In an embodiment, the receiver includes an avalanche photodiode (APD).

In an embodiment, the frequency synthesizing device includes a direct digital synthesizer (DDS) circuit.

In an embodiment, the laser processing device includes a laser driving circuit and laser diodes.

In an embodiment, a color of the visible light signal is green, blue, or red.

In an embodiment, a wavelength of the visible light signal is in a range of 440 nanometers (nm) to 580 nm, and the wavelength of the first invisible light signal and the wavelength of the second invisible light signal are both greater than 760 nm.

In order to make the above purpose, features, and advantages be more obvious and understandable in embodiments of the disclosure, the following content provides exemplary embodiments in conjunction with the drawings, and a detailed explanation is as follows.

BRIEF DESCRIPTION OF DRAWINGS

In order to more clearly explain the technical solutions of the embodiments of the disclosure, the drawings required in the embodiments of the disclosure will be briefly introduced below. It should be understood that the following drawings only show some embodiments of the disclosure, and therefore should not be regarded as a limitation of the scope. For those of ordinary skill in the art, other related drawings may be derived from these drawings without creative work.

DETAILED DESCRIPTION OF EMBODIMENTS

Figure 1:
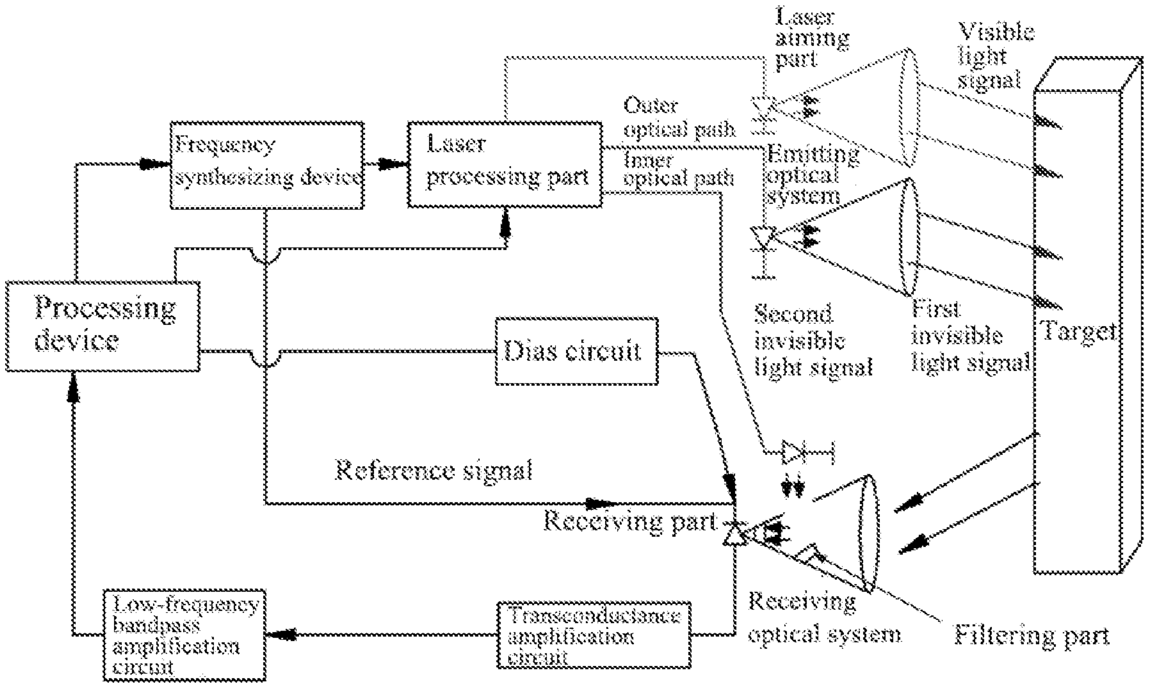
FIG. 1 illustrates a schematic diagram of a dual-wavelength phase range finder for improving measurement of vision capture provided in an embodiment of the disclosure.

In order to explain and understand the disclosure clearer, the disclosure is described in detail through specific embodiments in combination with the drawings.

At present, a red light ranging scheme on the market has shortcomings including a short measurement range and poor measurement accuracy, and thus it is difficult to be used in outdoor measurement.

In view of the above shortcomings, embodiments of the disclosure provide a dual-wavelength phase range finder for improving measurement of visual capture. A laser aiming device is added to the dual-wavelength phase range finder, the laser aiming device is configured to emit a visible light signal to the naked eye, and an outer optical path is configured to emit a first invisible light signal for measurement, and thus the measurement can be performed by a dual-wavelength measurement method. Even in a strong light environment, the naked eye of the user can also accurately see whether the visible light is irradiated on the target, and thus the range finder can adapt to measurements in various environments. The dual-wavelength phase range finder also improves measurement range, measurement accuracy, and measurement speed, and the dual-wavelength phase range finder solves the problem of large measurement errors in various complex environments.

It should be understood that the dual-wavelength phase range finder for improving measurement of visual capture may also be referred to as a laser ranging system.

It should be noted that the dual-wavelength phase range finder may be applied to an outdoor environment as well as an indoor environment.

In order to understand the above technical solutions clearer, exemplary embodiments of the disclosure will be described in detail below with reference to the drawings. Although the exemplary embodiments of the disclosure are shown in the drawings, it should be understood that the disclosure may be implemented in various forms and should not be limited by the embodiments set forth herein. On the contrary, these embodiments are provided to understand the disclosure clearer and to fully convey the scope of the disclosure to those skilled in the art.

It should be noted that the devices involved in the embodiments of the disclosure are all physical devices, and the connection modes involved are physical connections.

Please refer to FIG. 1, FIG. 1 illustrates a schematic diagram of a dual-wavelength phase range finder for improving measurement of vision capture provided in an embodiment of the disclosure. As shown in FIG. 1, the dual-wavelength phase range finder includes an emitting device, a receiving device, and a processing device. Specifically, the emitting device may include a frequency synthesizing device, a laser processing device, a laser aiming device configured to aim a target, and an emitting optical system configured to collimate and focus a laser and project the laser on the target. The receiving device may include a receiving optical system configured to receive signals diffusely reflected back from the target and focus the signals on a receiver, a filtering device, and a signal-transmitting circuit of the receiving device. The signal-transmitting circuit includes a transconductance amplification circuit and a low-frequency bandpass amplification circuit; the transconductance amplification circuit is configured to pre-amplify a first low-frequency signal and a second low-frequency signal demodulated by the receiver to obtain a pre-amplified first low-frequency signal and a pre-amplified second low-frequency signal; and the low-frequency bandpass amplification circuit is configured to amplify the pre-amplified first low-frequency signal and the pre-amplified second low-frequency signal within a preset frequency range to obtain actual phase signals.

Specifically, the processing device may control the frequency synthesizing device to generate a high-frequency modulation signal and a reference signal. The high-frequency modulation signal passes through the laser processing device to generate a first invisible light signal configured to emit to the target, the first invisible light signal may be collimated and focused by the emitting optical system to project onto the target, and an optical path that the first invisible light signal is emitted from the emitting optical system, irradiated on the target, diffusely reflected to the filtering device, and emitted to the receiver is considered as an outer optical path. The frequency synthesizing device may simultaneously generate another invisible optical path with the same frequency as the outer optical path, and the another invisible optical path is directly irradiated to an inner optical path of the receiver through the filtering device. The filtering device only allows measurement signals to pass through, and light signals with other wavelengths are blocked by the filtering device (in other words, the filtering device only allows a first reflecting light signal, a second invisible light signal used as a reference, and other measurement signals with long wavelengths to pass through; and the filtering device filters out signals with short wavelengths, such as a second reflecting light signal), i.e., the filtering device is configured to allow the first reflecting light signal and the second invisible light signal to pass through, the first reflecting light signal is obtained by reflecting the first invisible light signal after the first invisible light signal is irradiated onto the target, the filtering device is further configured to block the second reflecting light signal (i.e., block the second reflecting light signal), the second reflecting light signal is obtained by reflecting the visible light signal after the visible light signal is irradiated onto the target, thereby to avoid interference of two wavelengths affecting measurement of a distance. Specifically, the wavelength of the first invisible light signal is equal to the wavelength of the second invisible light signal.

In addition, While measuring, the processing device also controls the laser aiming device to emit visible light signals or laser signals (such as a green laser, a blue laser, or a red laser) with strong visual impacts, and thus the target can be seen clearly under strong outdoor lights by using the strong visual impacts of light sources.

Furthermore, the processing device may control the first reflecting light signal and the reference signal to undergo a photoelectric frequency mixing process at the receiver, thereby obtaining the first low-frequency signal used to measure the distance. The processing device further controls the second invisible light signal and the reference signal to undergo the photoelectric frequency mixing process at the receiver, thereby obtaining the second low-frequency signal used to measure the distance. The first low-frequency signal and the second low-frequency signal are transmitted to the processing device through the transconductance amplification circuit and the low-frequency bandpass amplification circuit for phase discrimination to obtain resultant distance data. For example, the processing device may use an existing method to calculate a time difference between the first low-frequency signal amplified by the low-frequency bandpass amplification circuit (i.e., the amplified first low-frequency signal mentioned above) and the second low-frequency signal amplified by the low-frequency bandpass amplification circuit (i.e., the amplified second low-frequency signal mentioned above), and the distance between the dual-wavelength phase range finder and the target is calculated according to the time difference.

In addition, please refer to FIG. 1, the dual-wavelength phase range finder further includes a bias circuit configured to generate and supply a bias voltage to the receiver under control of the processing device, and one end of the bias circuit is connected to the processing device and the other end of the bias circuit is connected to the receiver.

In addition, please refer to FIG. 1, the dual-wavelength phase range finder further includes a display device configured to display the distance, and the display device is connected to the processing device.

In an embodiment, the wavelength of the visible light signal is in a range of 440 nanometers (nm) to 580 nm.

In an embodiment, the wavelength of the first invisible light signal is greater than 760 nm, and the wavelength of the first invisible light signal is equal to the wavelength of the second invisible light signal.

Figure 2:
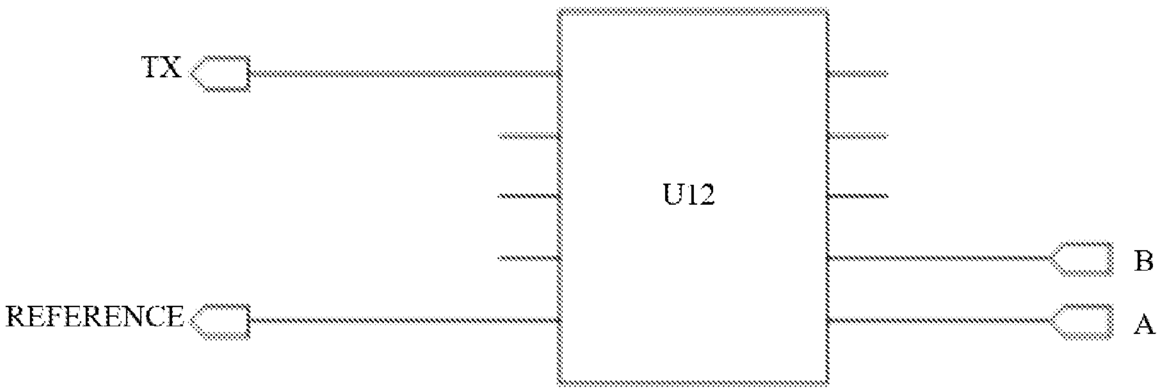
FIG. 2 illustrates a schematic diagram of a frequency synthesizing device provided in the embodiment of the disclosure.

In an embodiment, please refer to FIG. 2, FIG. 2 illustrates a schematic diagram of a frequency synthesizing device provided in the embodiment of the disclosure. The processing device may control the frequency synthesizing device by a port A and a port B on the frequency synthesizing device, and the processing device controls the frequency synthesizing device to output multiple sets of high-frequency modulation signals TX and reference signals REFERENCE.

The frequency synthesizing device may be a direct digital synthesizer (DDS) circuit. Multiple sets of phase-locked loop (PLL) high-frequency oscillation signals are generated by the control of the processing device. In use, a set of PLL high-frequency oscillation signals is selected as the high-frequency modulation signals for output.

Figure 3:
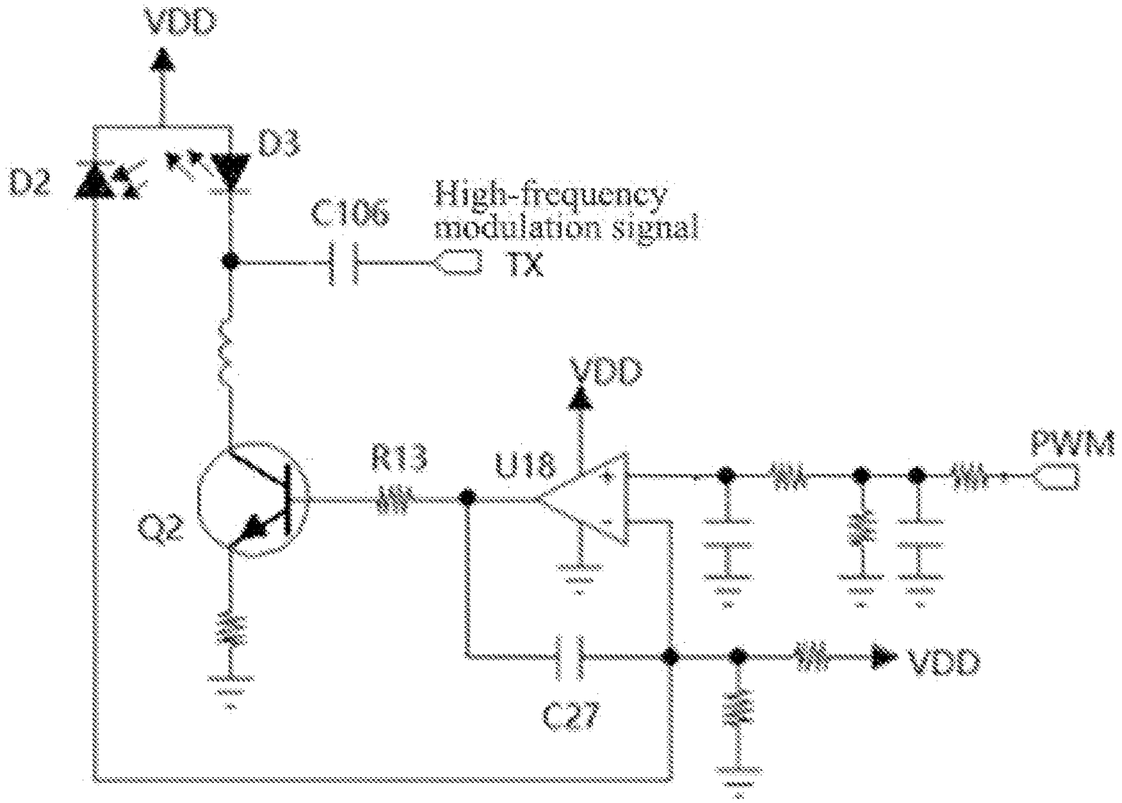
FIG. 3 illustrates a schematic diagram of a laser processing device provided in the embodiment of the disclosure.

In an embodiment, please refer to FIG. 3, FIG. 3 illustrates a schematic diagram of a laser processing device provided in the embodiment of the disclosure. As shown in FIG. 3, the laser processing device may include an automatic laser power control circuit, which may include peripheral components such as a laser diode D3, a transistor Q2, and a comparator U18. Furthermore, the automatic laser power control circuit is simple, the automatic laser power control circuit may effectively control the automatic laser power and ensure that the laser emission power remains unchanged in an environment of −20 Celsius degrees (° C.)~60° C., thereby ensuring stable ranging accuracy.

In an embodiment, the laser aiming device may be an existing laser-emitting device, the processing device may control the laser aiming device to turn on or turn off, thereby controlling whether to emit the visible light.

In an embodiment, the emitting optical system may be an existing emitting optical system, the emitting optical system is configured to ensure that a laser is collimated, focused, and projected onto the target, and the embodiments of the disclosure are not limited to this.

In an embodiment, the receiving optical system may be an existing receiving optical system, and the embodiments of the disclosure are not limited to this.

In an embodiment, the filtering device may be a wavelength filter.

Figure 4:
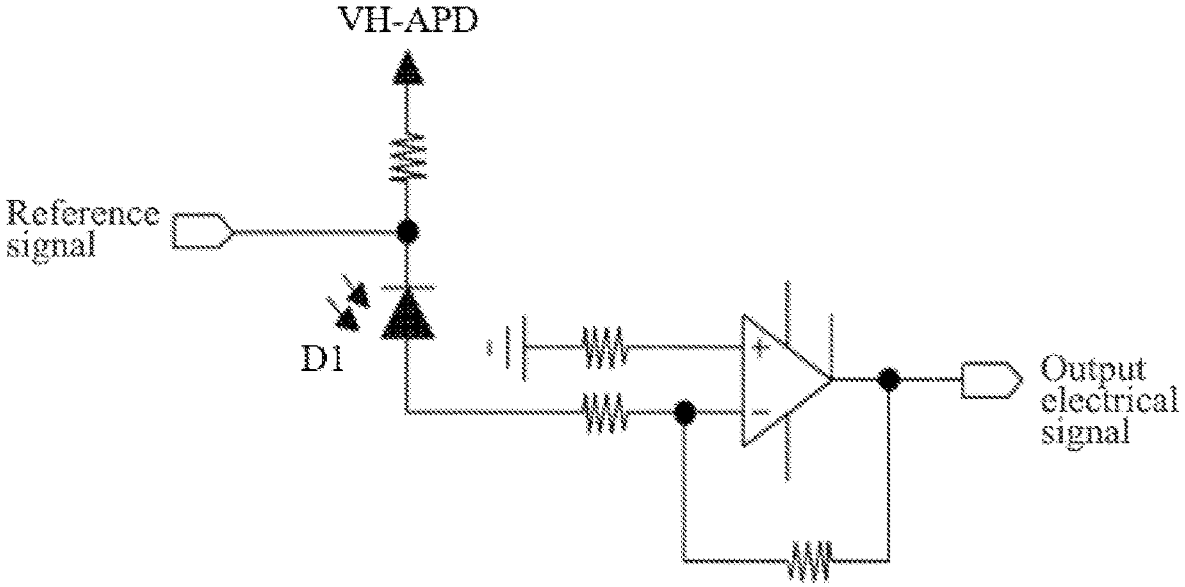
FIG. 4 illustrates a schematic diagram of a receiver and a transconductance amplification circuit provided in the embodiment of the disclosure.

In an embodiment, please refer to FIG. 4, FIG. 4 illustrates a schematic diagram of a receiver and a transconductance amplification circuit provided in the embodiment of the disclosure. As shown in FIG. 4, the receiver may be an avalanche photodiode (APD) or a photodiode.

Specifically, when the receiver is APD, the receiver is more sensitive to receive light signals, and the receiver has high gain and low noise, which ensures the ranging accuracy. The transconductance amplification circuit and APD form an optoelectronic frequency mixing circuit configured to demodulate out low-frequency signals.

Figure 5:
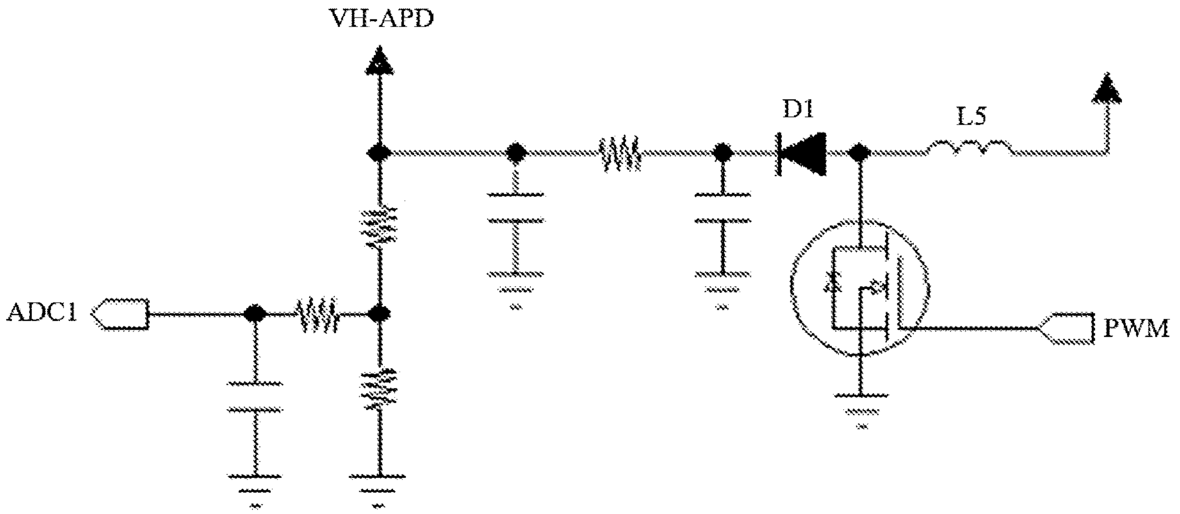
FIG. 5 illustrates a schematic diagram of a bias circuit provided in the embodiment of the disclosure.

In an embodiment, please refer to FIG. 5, FIG. 5 illustrates a schematic diagram of a bias circuit provided in the embodiment of the disclosure. As shown in FIG. 5, the bias circuit may include peripheral components such as an inductance L5 and a diode D1. Moreover, the bias circuit changes the frequency control of pulse width modulation (PWM) and analog-to-digital conversion sampling of channel 1 of analog-to-digital converter (ADC1), which can achieve VH-APD voltage output accuracy of 0.1 volts (V). Traditional methods cannot achieve the voltage output accuracy of the disclosure. Furthermore, high-precision voltage is supplied to APD to improve the resolution of APD, thereby improving resultant ranging accuracy of the disclosure.

In an embodiment, the transconductance amplification circuit may be an existing transconductance amplification circuit, as long as the transconductance amplification circuit ensures that the signal of the outer optical path (i.e. the first low-frequency signal) and the signal of the inner optical path (i.e. the second low-frequency signal) undergo pre-amplification after demodulation of the receiver, the embodiments of the disclosure are not limited to this.

Figure 6:
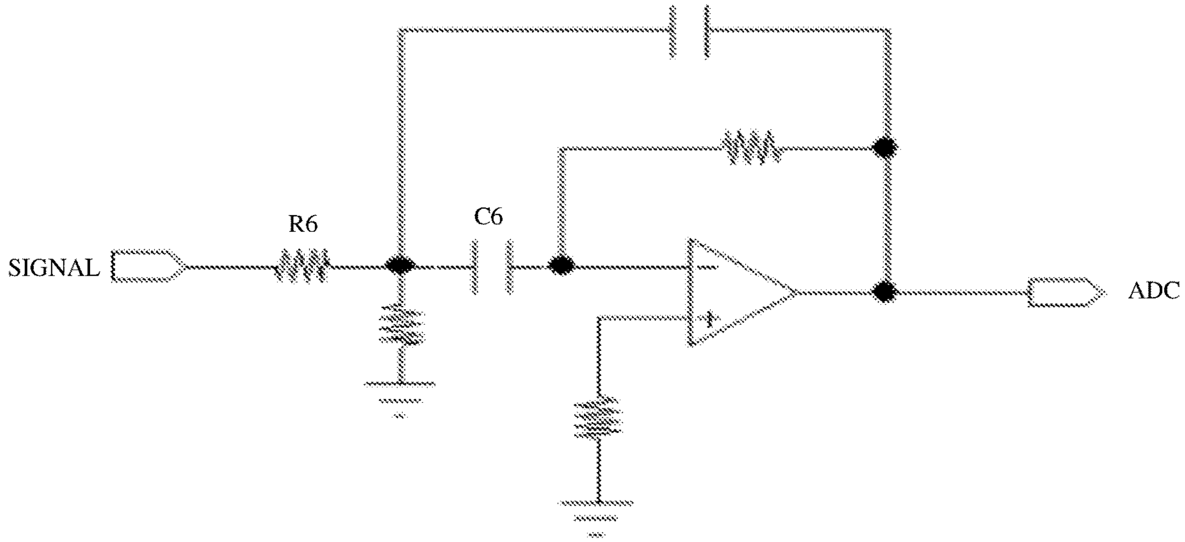
FIG. 6 illustrates a schematic diagram of a low-frequency bandpass amplification circuit provided in the embodiment of the disclosure.

In an embodiment, please refer to FIG. 6, FIG. 6 illustrates a schematic diagram of a low-frequency bandpass amplification circuit provided in the embodiment of the disclosure. The low-frequency bandpass amplification circuit includes peripheral components such as a resistor R6 and a capacitor C6. The low-frequency bandpass amplification circuit is further configured to make the pre-amplified signals and reference signal be amplified within a preset frequency range, signals outside the frequency range are blocked, and useful signals are better amplified without distortion, which greatly improves measurement accuracy (also referred to as ranging accuracy) and stability.

In an embodiment, the display device may be a light emitting diode (LED) display screen.

In an embodiment, the processing device may be a chip or the like. Moreover, the processing device may achieve the phase discrimination of hardware, control various branches, and send the ranging data to the display device. Therefore, the range finder of the disclosure does not require an additional phase discrimination system needed in traditional ranging devices to complete ranging, which greatly reduces costs. The problems existing in production are correspondingly reduced, and the product appearance may be made small and compact.

Therefore, based on the above technical solutions, in the embodiments of the disclosure, the laser aiming device is added to the dual-wavelength phase range finder, and the laser aiming device may emit the visible light signal to the naked eye. Even in a strong light environment, the naked eye of the user can also accurately see whether the visible light is irradiated on the target, and thus the range finder can adapt to measurements in various environments. The dual-wavelength phase range finder also improves measurement range, measurement accuracy, and measurement speed, and the dual-wavelength phase range finder solves the problem of large measurement errors in various complex environments.

It should be understood that a specific structure of the frequency synthesizing device, a specific structure of the laser processing device, a specific structure of the laser aiming device, a specific structure of the emitting optical system, a specific structure of the receiving optical system, a specific structure of the filtering device, a specific structure of the receiver, a specific structure of the bias circuit, a specific structure of the transconductance amplification circuit, a specific structure of the low-frequency bandpass amplification circuit, a specific structure of the processing device, and a specific structure of the display device, a specific wavelength of the visible light signal, a specific wavelength of the first invisible light signal, and a specific wavelength of the second invisible light signal may be set according to actual needs. The embodiments of the disclosure are not limited to these.

In the description of the disclosure, it should be understood that the terms "first", "second", and the like are only used for a descriptive purpose and cannot be understood as indicating or implying relative importance or implying the number of indicated technical features. Therefore, features limited to "first", "second", and the like can explicitly or implicitly include one or more of these features. In the description of the disclosure, the meaning of "multiple" refers to two or more, unless otherwise specified.

In the disclosure, unless otherwise specified and defined, the terms such as "install", "connect", and "fix" should be interpreted in a broad sense. For example, the meanings of the terms can be a fixed connection, a detachable connection, an integration, a mechanical connection, or an electrical connection; the meanings of the terms can be a direct connection or indirect connection through an intermediate medium; and the meanings of the terms can be an internal connection of two elements or an interaction relationship between two elements. Those of ordinary skill in the art can understand the specific meanings of the above terms in the disclosure according to specific situations.

In the disclosure, unless otherwise specified and limited, the meaning of a first feature is "above" or "below" a second feature refers to the first and second features can be in direct contact, or the first and second features can be in indirect contact through an intermediate medium. In addition, the first feature is "on", "above", or "over" the second feature may mean that that first feature is directly above or obliquely above the second feature, or simply mean that the first feature is higher than the second feature. The first feature is "under" or "below" the second feature may mean that that first feature is directly below or obliquely below the second feature, or simply mean that the first feature is lower than the second feature.

In the description of this specification, the terms "an embodiment", "some embodiments", "specific embodiments", "examples", or "specific examples" mean that the specific features, structures, materials, or features described in conjunction with the embodiment or example are included in at least one embodiment or example of the disclosure. In the specification, schematic expressions of the above terms are not necessarily directed to the same embodiment or example. Furthermore, the specific features, structures, materials, or features described may be combined in a suitable manner in any one or more embodiments or examples. Furthermore, different embodiments or examples and features of different embodiments or examples described in the specification may be combined and incorporated by those skilled in the art.

Although embodiments of the disclosure have been shown and described above, it can be understood that the above embodiments are exemplary and cannot be understood as limitations to the disclosure. Those of ordinary skill in the art can make changes, modifications, substitutions, and variations to the above embodiments within the scope of the disclosure.

What is claimed is:

1. A phase range finder, comprising:

an emitting device, a receiving device, and a processing device;

wherein the emitting device comprises a frequency synthesizing device, a laser processing device, and a laser aiming device; and the laser processing device is connected between the frequency synthesizing device and the laser aiming device;

wherein the processing device is configured to control the frequency synthesizing device to generate a high-frequency modulation signal and a reference signal, and the high-frequency modulation signal and the reference signal are electrical signals; the high-frequency modulation signal passes through the laser processing device to define an outer optical path emitted to a target and define an inner optical path emitted to a filtering device of the receiving device, the processing device is further configured to control the laser aiming device to emit a visible light signal for aiming at the target, the outer optical path is configured to emit a first invisible light signal, the inner optical path is configured to emit a second invisible light signal, and a wavelength of the first invisible light signal is equal to a wavelength of the second invisible light signal;

wherein the receiving device comprises the filtering device, a receiver, and a signal-transmitting circuit;

wherein the filtering device is configured to allow a first reflecting light signal and the second invisible light signal to pass through, and the first reflecting light signal is obtained by reflecting the first invisible light signal after the first invisible light signal is irradiated onto the target; the filtering device is further configured to block a second reflecting light signal, and the second reflecting light signal is obtained by reflecting the visible light signal after the visible light signal is irradiated onto the target; the processing device is further configured to control the first invisible light signal and the reference signal to undergo a photoelectric frequency mixing process at the receiver, thereby to obtain a first low-frequency signal; the processing device is further configured to control the second invisible light signal and the reference signal to undergo the photoelectric frequency mixing process at the receiver, thereby to obtain a second low-frequency signal; and the first low-frequency signal and the second low-frequency signal are transmitted to the processing device through the signal-transmitting circuit;

wherein the signal-transmitting circuit comprises a transconductance amplification circuit and a low-frequency bandpass amplification circuit connected in series, the transconductance amplification circuit is connected between the receiver and the low-frequency bandpass amplification circuit, and the low-frequency bandpass amplification circuit is connected to the processing device; the transconductance amplification circuit is configured to respectively pre-amplify the first low-frequency signal and the second low-frequency signal to obtain a pre-amplified first low-frequency signal and a pre-amplified second low-frequency signal, and transmit the pre-amplified first low-frequency signal and the pre-amplified second low-frequency signal to the low-frequency bandpass amplification circuit; and the low-frequency bandpass amplification circuit is configured to respectively amplify the pre-amplified first low-frequency signal and the pre-amplified second low-frequency signal in a preset frequency range, thereby to obtain an amplified first low-frequency signal and an amplified second low-frequency signal, and transmit the amplified first low-frequency signal and the amplified second low-frequency signal to the processing device; and wherein the processing device is configured to determine a distance between the phase range finder and the target based on a time difference between the amplified first low-frequency signal and the amplified second low-frequency signal.

2. The phase range finder as claimed in claim 1, wherein a wavelength of the visible light signal is smaller than the wavelength of the first invisible light signal.

3. The phase range finder as claimed in claim 1, wherein the phase range finder further comprises a bias circuit configured to generate and supply a bias voltage to the receiver under control of the processing device, and a first end of the bias circuit is connected to the processing device and a second end of the bias circuit is connected to the receiver.

4. The phase range finder as claimed in claim 1, wherein the phase range finder further comprises a display device configured to display the distance, and the display device is connected to the processing device.

5. The phase range finder as claimed in claim 1, wherein the receiver comprises an avalanche photodiode (APD).

6. The phase range finder as claimed in claim 5, wherein the frequency synthesizing device comprises a direct digital synthesizer (DDS) circuit.

7. The phase range finder as claimed in claim 5, wherein the laser processing device comprises a laser driving circuit and laser diodes.

8. The phase range finder as claimed in claim 1, wherein a color of the visible light signal is green, blue, or red.

9. The phase range finder as claimed in claim 1, wherein a wavelength of the visible light signal is in a range of 440 nanometers (nm) to 580 nm, and the wavelength of the first invisible light signal and the wavelength of the second invisible light signal are both greater than 760 nm.

10. A phase range finder, wherein the phase range finder comprises a frequency synthesizing device, a processing device, a laser processing device, a bias circuit, a laser aiming device, and a receiving device;

wherein the laser aiming device is connected to the frequency synthesizing device through the laser processing device;

wherein a first end of the bias circuit is connected to the processing device, and a second end of the bias circuit is connected to a receiver of the receiving device;

wherein the processing device is configured to control the frequency synthesizing device to generate a high-frequency modulation signal and a reference signal, the high-frequency modulation signal and the reference signal are electrical signals, and the high-frequency modulation signal is processed through the laser processing device to emit a first invisible light signal and a second invisible light signal; the processing device is further configured to control the laser aiming device to emit a visible light signal; the visible light signal is configured to aim a target and obtain a second reflecting light signal reflected by the target; the first invisible light signal is configured to be irradiated onto the target and obtain a first reflecting light signal reflected by the target; and the second invisible light signal is configured to be emitted to a filtering device of the receiving device;

wherein the receiving device comprises the filtering device, the receiver, a transconductance amplification circuit, and a low-frequency bandpass amplification circuit;

wherein the filtering device is configured to allow the first reflecting light signal and the second invisible light signal to pass there-through, and filter-out the second reflecting light signal;

wherein the processing device is further configured to control the receiver to perform a photoelectric frequency mixing process on the first reflecting light signal and the reference signal to obtain a first low-frequency signal, and control the receiver to perform the photoelectric frequency mixing process on the second reflecting light signal and the reference signal to obtain a second low-frequency signal; and wherein the transconductance amplification circuit and the low-frequency bandpass amplification circuit are connected in series, the transconductance amplification circuit is connected between the receiver and the low-frequency bandpass amplification circuit, and the low-frequency bandpass amplification circuit is connected to the processing device; the transconductance amplification circuit is configured to respectively pre-amplify the first low-frequency signal and the second low-frequency signal to obtain a pre-amplified first low-frequency signal and a pre-amplified second low-frequency signal, and transmit the pre-amplified first low-frequency signal and the pre-amplified second low-frequency signal to the low-frequency bandpass amplification circuit; and the low-frequency bandpass amplification circuit is configured to respectively amplify the pre-amplified first low-frequency signal and the pre-amplified second low-frequency signal in a preset frequency range and cut off the pre-amplified first low-frequency signal and the pre-amplified second low-frequency signal outside the preset frequency range, thereby to obtain an amplified first low-frequency signal and an amplified second low-frequency signal, and transmit the amplified first low-frequency signal and the amplified second low-frequency signal to the processing device, and the processing device is further configured to determine a distance between the phase range finder and the target based on a time difference between the amplified first low-frequency signal and the amplified second low-frequency signal.

11. The phase range finder as claimed in claim 10, wherein a wavelength of the first invisible light signal is equal to a wavelength of the second invisible light signal.

12. The phase range finder as claimed in claim 11, wherein the wavelength of the first invisible light signal is greater than the visible light signal.

13. The phase range finder as claimed in claim 12, wherein the receiver comprises an APD.

14. The phase range finder as claimed in claim 13, wherein the frequency synthesizing device comprises a DDS circuit.

15. The phase range finder as claimed in claim 14, wherein the laser processing device comprises a laser driving circuit and laser diodes.

16. The phase range finder as claimed in claim 15, wherein the filtering device comprises a wavelength filter.

17. A phase range finder, comprising:

an emitting device, a receiving device, and a processing device;

wherein the emitting device comprises a frequency synthesizing device, a laser processing device, a laser aiming device, and an emitting optical system;

wherein the receiving device comprises a receiving optical system, a filtering device, a receiver, a transconductance amplification circuit, and a low-frequency bandpass amplification circuit;

wherein the processing device is configured to control the frequency synthesizing device to generate a high-frequency modulation signal and a reference signal, and the high-frequency modulation signal and the reference signal are electrical signals; the laser processing device is configured to process the high-frequency modulation signal to emit a first invisible light signal and a second invisible light signal; the processing device is further configured to control the laser aiming device to emit a visible light signal; the visible light signal is configured to aim a target and obtain a second reflecting light signal reflected by the target; the emitting optical system is configured to receive the first invisible light signal from the laser processing device and irradiate the first invisible light signal onto the target and obtain a first reflecting light signal reflected by the target; the filtering device is configured to allow the first reflecting light signal and the second invisible light signal to pass there-through, and filter-out the second reflecting light signal; and the receiving optical system is configured to receive the first reflecting light signal and the second invisible light signal from the filtering device, and focus the first reflecting light signal and the second invisible light signal to the receiver;

wherein the processing device is further configured to control the receiver to perform a photoelectric frequency mixing process on the first reflecting light signal and the reference signal to obtain a first low-frequency signal, and control the receiver to perform the photoelectric frequency mixing process on the second reflecting light signal and the reference signal to obtain a second low-frequency signal; and wherein the transconductance amplification circuit and the low-frequency bandpass amplification circuit are connected in series, the transconductance amplification circuit is connected between the receiver and the low-frequency bandpass amplification circuit, and the low-frequency bandpass amplification circuit is connected to the processing device; the transconductance amplification circuit is configured to respectively pre-amplify the first low-frequency signal and the second low-frequency signal to obtain a pre-amplified first low-frequency signal and a pre-amplified second low-frequency signal, and transmit the pre-amplified first low-frequency signal and the pre-amplified second low-frequency signal to the low-frequency bandpass amplification circuit; and the low-frequency bandpass amplification circuit is configured to respectively amplify the pre-amplified first low-frequency signal and the pre-amplified second low-frequency signal in a preset frequency range, thereby to obtain an amplified first low-frequency signal and an amplified second low-frequency signal, and transmit the amplified first low-frequency signal and the amplified second low-frequency signal to the processing device, and the processing device is further configured to determine a distance between the phase range finder and the target based on the amplified first low-frequency signal and the amplified second low-frequency signal.

18. The phase range finder as claimed in claim 17, wherein a wavelength of the first invisible light signal is equal to a wavelength of the second invisible light signal, and the wavelength of the first invisible light signal is larger than a wavelength of the visible light signal.

19. The phase range finder as claimed in claim 18, wherein a color of the visible light signal is green, blue, or red.

* * * * *